UNITED STATES PATENT OFFICE.

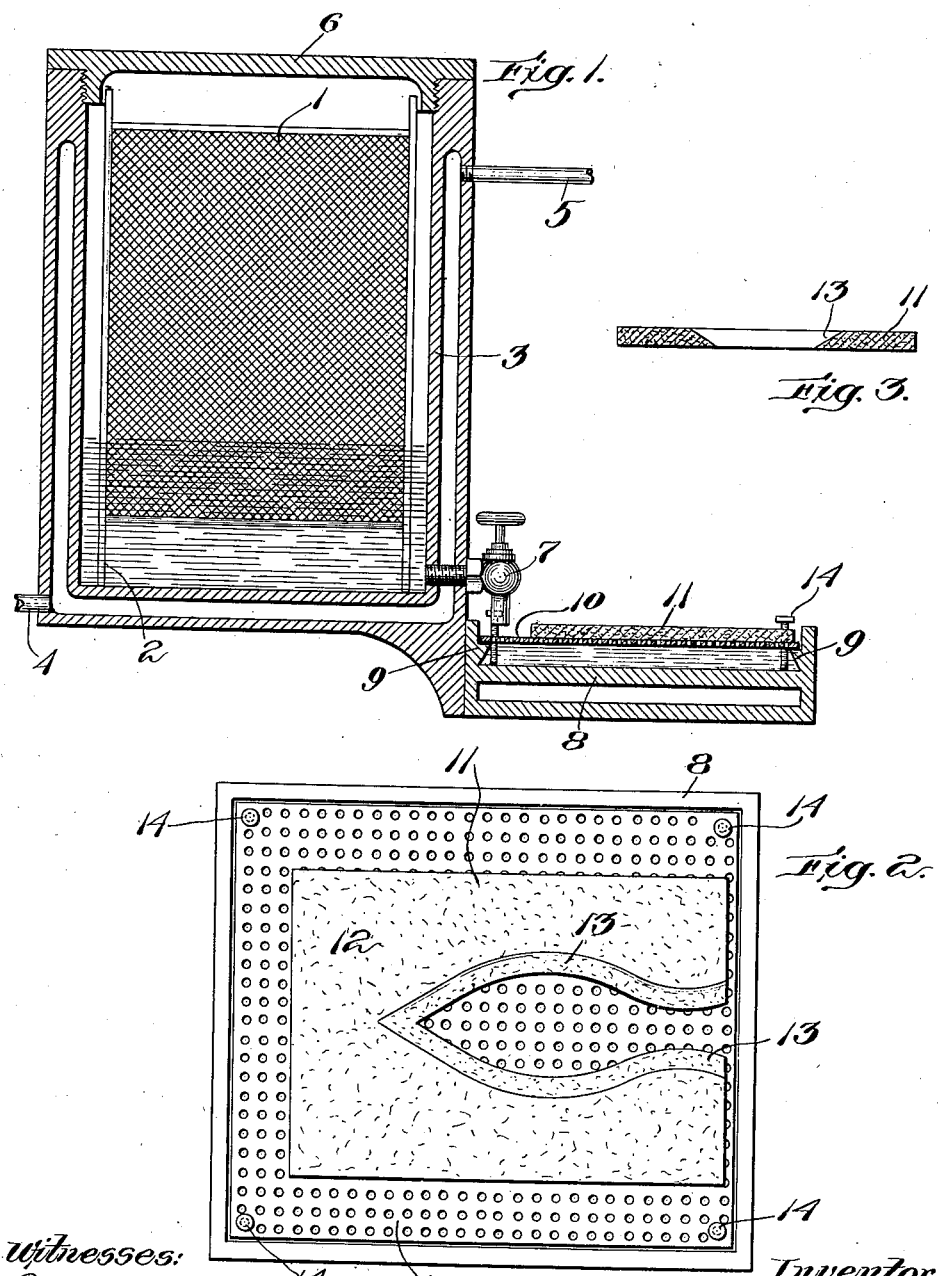

ANDREW THOMA, OF CAMBRIDGE, MASSACHUSETTS, ASSIGNOR TO THOMA CORPORATION, OF PORTLAND, MAINE, A CORPORATION OF MAINE.

METHOD OF AND APPARATUS FOR APPLYING AND USING CEMENT.

No. 862,944.  Specification of Letters Patent.  Patented Aug. 13, 1907.

Application filed July 27, 1906. Serial No. 328,046.

*To all whom it may concern:*

Be it known that I, ANDREW THOMA, a citizen of the United States, and a resident of Cambridge, in the county of Middlesex and State of Massachusetts, have invented an Improvement in Methods of and Apparatus for Applying and Using Cement, of which the following description, in connnection with the accompanying drawings, is a specification, like letters on the drawings representing like parts.
My present method is available for many uses, but is primarily intended for preparing leather pieces to be united, as where one piece is prepared long beforehand and subjected to an intervening soaking in water to render it pliable and the other piece is to be cemented and immediately secured to the long previously cemented piece. Such work is at present accomplished slowly, expensively and unsatisfactorily by the use of rubber cement containing a volatile solvent, such as naphtha, in which case the pieces of leather have to be kept apart for a long time until set by the evaporation of the volatile solvent, whereupon they are soaked, the other pieces are then similarly coated and kept standing until set, and the two are then pressed together and thereby united.
By my method, I entirely eliminate the above-mentioned delay, lack of neatness, and undue handling, as well as the fire-risk and wastefulness. I employ two cements, one cement being capable of changing quickly from a tacky condition to a resistant or non-adherent condition, being a non-volatile cement having small specific heat so that it quickly changes from a warm tacky condition to a cool comparatively stiff and resistant or non-tacky condition, and the other cement being tenacious and viscous, as distinguished from short. I may employ the kind of cement set forth in my application Ser. No. 340,337 filed Oct. 24, 1906. To get the best and most expeditious and thorough results, the cement must be applied in exceedingly thin and even layers, more so than is commercially practicable with a brush or the like, and must be applied hot. The means which I will presently describe, however, accomplishes the desired result with extreme facility and rapidity. This is of great importance, it being remembered that the kind of cementing or union of parts for which my method is primarily intended is availed of as a preparatory step for holding the parts together while being permanently stitched or sewed, and hence it is essential to perform the cementing quickly and not require time for the setting or drying of the cemented parts. For instance, in shoe manufacture it is customary and most convenient to cement the inner surface of the outer-soles after they have been cut and sorted in the sole leather room and tied together in case lots. They are then cemented and held for several days before being used. By having them coated with quick setting tenacious cement applied in a thin layer, so that it becomes almost instantly unyielding or short to the touch, they can be immediately stacked in bundles without adhering to each other or soiling each other. On the other hand, the welt (projecting from the lasted and filled shoe) is not cemented until the shoe has reached that stage in its progress when the shoes are laid, individually separated, on the traveling rack so that no inconvenience can result from employing very sticky, sensitive cement. I avail myself of these conditions to accomplish speed, economy of labor and of cement, neatness and efficiency. These results are brought about by applying to the outer scle, in a thin layer, a hard, or at least, quick setting water-repellent cement preferably of a penetrating nature, and to the welt a very much more sensitive, tacky and sticky coating, so that when the two cemented surfaces come together and are finally put under pressure they not only adhere together strongly but actually intermingle, the softer coating imparting its nature to the harder and less sensitive coating.

Notwithstanding the previous dulling and chilling of the cement coating of the sole by the soaking which is necessary to render the sole pliable and moldable for sewing and shaping, the cement, because of its nature and of the time and manner of its application, has obtained and retains a hold or grip in the fibers of the leather in spite of the fact that the leather body is thoroughly saturated with water. In this condition, the damp leather, with its dulled cement coating meets the sensitive, viscous, tenacious coating of the welt and at once its latent adhesiveness is quickened into vigor and the parts unite instantly and strongly. Also a permanent waterproofing is effected. If it is desired to employ a more tacky coating for the sole than above preferred, it is applied the same as above and simply dusted with talc or the like, which is thereafter counteracted or set free by the subsequent soaking process. Also my cement renders it possible to obtain even still quicker results by a quick movement of the cemented face of the sole across a heated steam pipe or other hot surface, just as it is applied to the shoe bottom. If a tap is also used, the sole and tap are at once united by a thin coating of the tacky, quick setting cement, and then the inner surface of the tap is treated to the thin layer of short, quick-setting cement above described.

To apply the cement in the desired thin coating and to do it quickly and uniformly, I have devised a simple apparatus which I regard as an important invention, and have herein claimed the same broadly. One form of the apparatus is shown in the accompanying drawings, in which Figure 1 is a central vertical sectional view; Fig. 2 is an enlarged plan view of the cement applier; and Fig. 3 is a transverse sectional view of the pad.

The package or parcel of cement (as set forth in my aforesaid application, is thrown into the removable screen or holder 1, which stands raised on its legs 2 above the bottom of a steam-jacketed heater 3 (inlet at 4 and outlet for the superheated water at 5), the cover 6 is closed tightly and the cement is melted. A faucet 7 conducts the hot, fluid cement to a steam jacketed pan or basin 8 provided with ledges or other supports 9 on which rests a perforated plate 10, preferably of metal for transmitting the heat uniformly, to which is secured a felt or other absorbent pad or cement holder 11, which may have an extended plane area 12 to receive the soles and has a sloping shaped surface or contour 13 to receive the beaten-out welt at the periphery of the shoe bottom. The flow of cement is preferably maintained at a height just sufficient to keep the holes of the plate 10 filled, but may be adjusted by screws 14 to suit different requirements of cement delivery.

The operator cements the soles by simply pressing them upon the surface 12, or other flat pad. The pressure springs the plate 10 downwardly slightly and thereby automatically pumps up the right amount of cement to the absorbent part, and hence maintains the pad supplied with fluid cement, but yet in such limited quantity that only a thin neat, non-stringy coating is applied to the sole. When the plate 10 is made thin enough to yield or spring under pressure it is adjusted practically entirely above the cement body and depends upon the springing movement to keep it supplied with cement, but if the perforated plate 10 is rigid, it is adjusted so that the top of the body of cement just reaches up to the tops of the holes or perforations in the plate, the cement thereby standing in said holes ready to be caught by the capillary attraction of the pad above and sucked up into the pad. Said capillary attraction maintains the interstices of the pad loaded with the hot cement, and the repeated compression of the cushion-like fibrous pad operates like a pump to maintain the cement at or just beneath the top surface of the fabric and to deliver a thin film of the cement to the article when pressed against the pad. The pad acts to provide a thin, almost imperceptible film of cement, which is transferred direct to the leather surface at all points thereof simultaneously, i. e., perpendicularly to the surface, as distinguished from being smeared on with a brush or progressively applied by any other means. This cement film is transferred bodily or in a film condition while still hot or fluid, and tacky and penetrating.

The fibrous or absorbent character of the pad retains within its body the highly fluid, hot cement in a stable or non-flowing condition, so that at the surface of the pad only the slight and even film of cement is available, and the normally stringy cement is kept in this non-stringy, short, thin-film condition by the close presence of the local heat radiating means which prevents the setting of the cement or its becoming stringy until it is transferred to the leather. This is entirely different from applying mucilage with a sponge, or glue with a pad or dauber, as by my method and means it becomes possible to cement leather with an instantly chilling cement if desired, with great speed, neatness and economy. The normally stringy cement is so positively controlled that it can be applied in a sharply defined outline and definitely described area as never before. In other words, by my invention, it becomes possible to print bodily a given area with penetrating, tacky, normally semi-solid cement, whereby all the desirable results herein mentioned are attained.

My pad is sufficiently thick to act by capillary attraction, being dense like felt and acting somewhat like a sponge, except that my pad is more compact and therefore less absorbing, bringing about the delivery of the extremely sticky, heated, (and otherwise intractable) fluid in a thin film by holding it in suspension by suction or capillary attraction within the body of the pad and is entirely different in principle, construction and operation from a fabric which is porous in the sense of having holes or thin open meshes like wire gauze, burlap stretched taut, or cheese cloth stretched on a frame, and through which paste is forced to ooze and accumulate on top by upward pressure from beneath as in Patent 743,470. My delivery surface has no such porosity, the cement is not forced upward, and cannot accumulate on top, but is maintained in a thin surface film kept uniform by the suction of the thick, dense, felt-like pad, which, instead of being immersed in relatively tractable paste, is held in barely capillary relation to the normally intractable sticky, stringy, sluggish cement, which is maintained fluid and non-stringy within the pad by reason of the heated condition of the pad. Said patent employs force for pushing the paste up through the foraminous gauze or strainer-like thin web, whereas I provide means for checking or preventing a copious flow, and interpose a pad-like barrier which permits only sufficient flow of the sticky cement merely to wet the surface, said pad itself compelling and regulating the flow, and maintaining the normally non-fluid cement highly fluid (by its heated condition), so that the cement is ever present for delivery without stringing, and is thus present as a thin imperceptible film as distinguished from a flood or bath.

Cement composed of yellow pitch, alone or treated with pitches of vegetable, animal or mineral origin may be used, rendered readily fluid, low melting, cementitious, and strongly adhesive and quick setting by combination with compounds of oils with resins, gums or the like substances, all as set forth in my application aforesaid. The welt, which projects laterally from the shoe bottom of the partially completed shoe, is first beaten out flat by the usual beater machine and is then simply pressed downwardly against the inclined surface 13 of the pad 11, thereby spreading a thin film of sticky cement upon the welt, it being understood that a separate apparatus similar to that shown in the drawings is employed so as to hold a more viscous, tenacious cement than that used for cementing the sole. The central cavity in the pad is provided for the purpose of preventing the shoe bottom filler of the shoe from coming in contact with the cement, or in other words, it restricts the application of the cement to the welt or peripheral outline desired. I sometimes employ a special welt positioner for automatically engaging between the welt and vamp for holding and forcing the welt out 13 flat while it is engaging the pad, but as the present application does not relate to this feature, I have omitted showing it.

I wish it understood that my invention is not restricted to the details shown, as this case covers generically the different species of my invention contained in my copending applications Ser. Nos. 303,637; 303,638; and 340,729, which include a movable hand pad supplied with heat beneath its absorbent delivery surface, and a belt containing heat radiating means, and a power operated heated-pad, besides the stationary form of delivery pad herein shown.

By my method the cement is applied in a film in a non-stringy condition, so that it will separate sharply from the applying device without stringing and can be deposited on the article with a clean sharp line. The fibrous material of the pad is maintained hot by the perforated supporting plate, and serves to maintain a thin film at its delivery surface ready for instant transfer at all times to the leather, or other article which it is desired to cement. I have found that by employing a normally semi-solid cement capable of being rendered extremely fluid by heat, and by providing said hot cement in a thin film on a preferably flat heated surface, I can, by a suitable transferring device, preferably of absorbent material such as the pad 11, transfer to the piece of leather, lining or the like, the correct amount of cement and leave it on said lining or leather in a sharply defined area without any stringing, smearing or the like. To those who have used the usual rubber cement, this result will especially appeal, as it is practically impossible to use the ordinary cement without extreme stringing, smearing and waste, and it is also difficult from a practical standpoint to apply the cement exactly where it is wanted. This will be more apparent by a brief explanation of the present practice.

At present it is customary to apply certain naphtha-cut rubber-cements to the outersoles, taps and channels, and to the parts of the leather, lining, etc., forming the completed upper structure of the shoe, as, for instance, the fabric linings are cemented to the cut pieces of leather sufficiently to retain them in place while the parts are being stitched together or otherwise assembled. Also the edges of certain cut pieces are cemented so that said edges may be turned or hemmed and prepared for the subsequent assembling and stitching. A great many kinds of leather and other stock are used for shoe uppers or the like, which are treated artificially so as to improve their stiffness, texture, appearance, etc., and, as a rule, I find an oily or fatty condition of the flesh side of such leathers (excepting so called kid leather). The rubber cements as used by the trade are very detrimentally influenced by this oily or fatty condition mentioned, and hence often give the manufacturers much trouble. I have further found that the application of a naphtha-dissolved cement to an oil-treated leather surface influences and commingles the oily parts with the cementitious elements, inasmuch as both are influenced by the naphtha; and this mingling of the oil and rubber produces a deteriorating influence as well as destroying the adhesiveness of the rubber. But perhaps the most objectionable feature connected with the application of rubber cement is its smearing and stringing, which not only soils the work and makes neatness and accuracy impossible, but quickly fouls the bench, is wasteful, and causes delay. Accordingly my present invention does away with this smearing or stringing and applies and restricts the cement to the exact area and line desired, besides eliminating waste by evaporation and overcoming the other adverse conditions above mentioned, while at the same time providing a simple, inexpensive, and extremely expeditious means of enabling the manufacturer to get the best possible results in cementing and retaining the parts together. My invention also does away with the danger of having large quantities of combustible naphtha cement exposed on the premises.

My method includes, besides the feature of employing the cement in two conditions, i. e., one being of such a consistency and composition as to be quick setting and extremely sticky, and the other being of such a consistency and composition as to be short or much less sticky, two other leading features, preferably employed together, viz.: (1) using the cement in a thin film, and (2) applying it quite hot, so that it is non-stringy when applied. My method makes it possible to use a quick setting, non-volatile cement, because I apply the same in an exceedingly thin film and preferably apply it simultaneously to all the parts which it is desired to coat. This kind of cement is usually as stringy as rubber cement, but its stringing character may be temporarily suspended by producing for the moment extreme fluidity, and then, while still in this extreme condition, accomplishing the entire transfer to the article of the limited amount of cement necessary. This condition of extreme fluidity may be best produced by heat, and the transfer may be accomplished best in a thin film. The cement resumes its stringy condition as soon as transferred or applied to the article (which is usually cold), but, as the application has been accomplished, this condition is now advantageous instead of objectionable. The pad 11, or other similar transferring device capable of transferring an exceedingly thin film or layer, transfers exactly the amount of cement necessary simultaneously to all those portions which are to be cemented, and leaves the cement in just the condition required for joining the two parts which are to be secured together. The non volatile, quick setting cement is held in such a state of fluidity or self-repellent condition until actually deposited and fully separated from the depositing tool or medium that it will not cling to itself or to the tool, but will simply remain as placed. Notwithstanding the fact that the deposited cement sets partially instantly upon touching the cool article, no appreciable stringing can take place because the heat of the tool cuts off or prevents stringage.

By having the cement maintained in an extremely fluid condition and in a thin film on or at a delivery surface which is of such a nature (i. e., acting to subdivide the cement as in the case of a fibrous pad) or in such a condition (i. e., hot) that it can deliver said thin film bodily and entirely, i. e., without stringing, there is no dripping of cement, practically no waste, the cement is distributed with absolute uniformity to every portion of the surface impressed, the cementing is done by contact, with no brushing or back-and-forth distributing movement, the cementing is done instantly, and it becomes feasible to employ a quick setting cement with all its attendant advantages. One of the principal advantages has already been explained at length, viz., that the cemented pieces may be immediately stacked up on top of each other without adhering to each other, then soaked, and later they may receive the more viscous cemented body to which they are to be applied for immediate sewing. Also the quick setting cement, because of its penetrating qualities and non-volatile character, which causes the entire body of cement to remain fixed at the surface of the leather, makes it feasible, when applied as stated, to join two cemented surfaces as in turning or hemming, simply by pounding them together, even after they have been left exposed for a considerable time, there being sufficient body and adhesiveness remaining for this purpose notwithstanding that the exposed surface of cement has set or cooled. While I prefer to maintain the thin layer of freely fluid cement by means of the smooth flat surface, it may be maintained by a warm roll located over the cement pocket or trough of low melting cement, and also the applying device may be in the form of a roll, preferably hand operated. I depend upon the heat to temporarily dissipate the normally strong adhesiveness of the thin layer of the cement so that the latter can be removed as a thin layer instead of in a mass or in a thick layer. The heat makes this possible without stringing, and the thin layer leaves the cement surface pliable and sufficiently sticky for the purposes intended as the cement cools and sets, thereby regaining its strong adhesive character. By removing the entire surface of cement bodily and putting said entire surface down bodily upon the leather to be cemented, the operation is not merely done quickly, but it is done evenly and the outline or edges of the cemented surface are sharply defined without stringing or smearing.

Having described my invention, what I claim as new and desire to secure by Letters Patent is, 1. The herein described method, consisting of providing a low-melting cement, heating said cement, transferring the cement in a thin layer, and maintaining the cement hot and highly fluid while coming in contact with the part being cemented.

2. The herein described method, consisting of providing a quick-setting, low melting cement, heating said cement, and applying the cement in a hot, highly fluid condition under the influence of heat localized at the point of application.

3. The herein-described method, consisting of providing a non-volatile cement in the form of a thin, freely fluid, normally tacky film, and bodily transferring a definitely outlined predetermined area of said thin film directly to the part to be cemented while still freely fluid and in its thin film condition, and subsequently applying by pressure to said cemented part a sheet for joining the two together.

4. The herein-described method, consisting of providing a non-volatile cement in the form of a thin, even, freely fluid, tacky film, and bodily transferring said thin film in a sharply defined, predetermined area, perpendicularly to the part to be cemented while still fluid and in its thin film condition, and subsequently pressing a sheet flat against said cemented part for joining the two together.

5. The herein-described method, consisting of providing a non-volatile, low melting, tacky cement, heating said cement, transferring said cement in a thin sharply defined layer, and maintaining the cement heated to a short, non-stringy condition and highly fluid while coming in contact with the part being cemented.

6. The herein-described method, consisting of restricting the cement supply to a thin layer, maintaining said thin layer freely fluid and in a short, non-stringy condition, transferring bodily a prescribed and definitely outlined area of said thin fluid layer to the leather, and subsequently applying by pressure to said cemented area a sheet for joining the two.

7. The herein described method, consisting of providing a non-oxidizing, permanently adhesive, low melting and quick-setting cement in a thin, freely fluid condition, and maintaining the same in a non-flowing, non-stringy, even film while applying the same to the part to be cemented, and subsequently applying by pressure to said cemented part a sheet for joining the two together.

8. The herein described method, consisting of providing a non-volatile, non-oxidizing, permanently tacky, quick-setting cement in a thin, freely fluid condition, maintaining the same in a non-flowing, even film, applying said cement while in said condition, and subsequently pressing another part against the part to which the cement has previously been applied.

9. The herein described method, consisting of providing a non-volatile, non-oxidizing, permanently tacky, normally non-fluid, low melting and quick-setting cement, heating said cement to a thin, freely fluid, non-stringy condition and applying the same in the form of a thin even film to a part to be cemented, holding the cement in a non-flowing but highly fluid condition while being applied, and subsequently joining to said part another part by pressure against the cemented surface.

10. The herein-described method, consisting of restricting the cement supply to a thin, non-flowing layer, maintaining said thin layer in a freely fluid short condition, transferring bodily a definitely outlined prescribed area of said thin, short, fluid layer to the leather, and applying the same simultaneously to all portions of a corresponding area of the leather.

11. The herein-described method, consisting of providing a body of normally semi-solid stringy, quick setting cement; melting the same by heat, delivering said cement in the form of a freely fluid, non-stringy, film, and applying bodily a definitely outlined given area of said film directly to a corresponding area of the part to be cemented.

12. The herein described method of joining two shoe parts, consisting of providing a body of normally non-volatile, non-fluid, quick setting cement, heating said cement to a highly fluid condition, maintaining a delivery portion of said highly fluid cement in the form of a thin film, short and even in condition so as to be non-stringy and non-flowing at all parts of the film, transferring the film to the leather perpendicularly, as distinguished from laterally as in brushing, instantly separating, without stringing, the leather and transferring means while the cement and transferring means are hot, and subsequently pressing the cemented leather and the other shoe part together.

13. The herein-described method, consisting of applying to one part to be cemented a coating of hot cement having small specific heat and capable of quickly changing from a warm tacky condition to a cool short condition, and applying to the other part to be cemented a coating of quick setting normally tenacious and viscous cement, and then bringing the two cemented surfaces together under pressure.

14. The herein-described method, consisting of applying to the respective surfaces which are to be secured together, cementitious coatings of different degrees of stickiness, one of said coatings being normally in a comparatively resistant condition when set, and the other of said coatings being normally in a comparatively sticky, non-resistant condition, and then applying said two coated surfaces together under pressure.

15. The herein-described method, consisting of thinly coating the leather surface with a quick setting, normally stiff, resistant and non-stringy cement, soaking the leather piece to render the same pliable, thinly coating the other leather piece with a quick setting, viscous, tacky cement, and immediately applying under pressure the cemented surface of said soaked leather piece to the cemented surface of the other leather piece.

16. A cement applying device, heating means therefor and absorbing and distributing means at the delivery surface for maintaining a portion of the melted cement in a highly fluid, non-flowing, thin-film layer, constructed and arranged for transferring said layer bodily and without stringing to the article to be cemented.

17. A cement applying device, consisting of means having a dense absorbent exterior, capable of receiving cement and delivering the same from the interior outwardly to the article to be cemented, and heating means for maintaining the delivering surface of said absorbent means sufficiently hot to keep normally stringy cement in a short, non-stringy condition while being applied.

18. A cement applying device, consisting of a cement holder provided with a flat cement-delivering surface, having a dense absorbent exterior, and means for maintaining said absorbent exterior and its supply of cement heated.

19. A cement applying device, consisting of a cement holder having a suitable substantially rigid delivery surface, means for maintaining a supply of normally non-fluid cement in a fluid condition, means for getting said cement upon the delivery device from the cement supply in a thin well distributed film, and means connected with the delivery surface for maintaining said cement on said delivery surface in a condition of constant fluidity.

20. A cement applying device, consisting of a cement holder provided with a flat cement-receiving surface, having a dense, thick absorbent exterior, means for maintaining the same heated, and an automatic pumping means for supplying the cement from the back side to be transmitted outwardly to the delivery surface thereof.

21. A cement basin, means for heating the same, a cement delivering pad or absorbent layer, and a perforated yielding support thereunder capable of yielding or being depressed into the cement by pressure of the leather piece upon said cement delivering pad for pumping an even supply of the cement into said pad.

22. A cement applying device, consisting of a holder having an absorbent delivery part and a metal heat distributer for localizing adjacent to the cement delivering surface sufficient heat to maintain the normally stringy cement in a short, non-stringy condition while being applied, said absorbent delivering part retaining the cement within its body in a stable non-flowing condition and delivering the cement outwardly therefrom to the leather.

23. A cement applying device, having a delivery surface conforming in shape to the outline to be cemented, and provided with a local heater immediately adjacent to said shaped delivery surface for maintaining the normally stringy cement in a short, non-stringy condition while being applied, and the interior of said applying device being open to prevent cementing within the desired outline.

24. A cement applying device, having a sloping, shaped cement transmitting and delivery surface or contour to receive the beaten-out welt of a shoe-bottom, and means for maintaining said sloping surface supplied with a thin film of cement.

25. An apparatus of the kind described, comprising a cement reservoir, laterally extending means adjacent thereto for providing a flat surface of cement, dense absorbent means coöperating therewith for maintaining a thin delivery film of cement, and means for heating the aforesaid parts to maintain the cement in a highly fluid condition.

26. An apparatus of the kind described, comprising a source of cement supply, a horizontally extending basin for holding a body of highly fluid cement, a flat dense absorbent delivery surface for receiving said cement and delivering it to be applied to the article, and heating means for the aforesaid parts.

In testimony whereof, I have signed my name to this specification, in the presence of two subscribing witnesses.

ANDREW THOMA.

Witnesses:
WM. J. PIKE,
M. J. SPALDING.